United States Patent
Moore et al.

(10) Patent No.: US 8,902,451 B2
(45) Date of Patent: Dec. 2, 2014

(54) METHOD AND SYSTEM FOR AUTOMATICALLY GENERATING A COPY OF A PRINT STREAM

(75) Inventors: John A. Moore, Rochester, NY (US); Matthew D. Ruffell, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1222 days.

(21) Appl. No.: 12/392,416

(22) Filed: Feb. 25, 2009

(65) Prior Publication Data
US 2010/0214594 A1    Aug. 26, 2010

(51) Int. Cl.
G06F 3/12 (2006.01)
H04N 1/00 (2006.01)

(52) U.S. Cl.
CPC .......... *H04N 1/00222* (2013.01); *G06F 3/1275* (2013.01); *H04N 2201/0087* (2013.01); *G06F 3/1285* (2013.01); *G06F 3/1204* (2013.01); *H04N 2201/0094* (2013.01); *H04N 1/00347* (2013.01); *H04N 1/00233* (2013.01)
USPC .......... 358/1.15; 358/1.16; 709/219; 711/161

(58) Field of Classification Search
USPC ........ 705/7; 399/23; 707/1; 345/555; 358/1.1
See application file for complete search history.

(56) References Cited

U.S. PATENT DOCUMENTS

| | | | |
|---|---|---|---|
| 4,358,824 A | 11/1982 | Glickman et al. | |
| 4,941,125 A | 7/1990 | Boyne | |
| 5,742,807 A | 4/1998 | Masinter | |
| 5,978,477 A | 11/1999 | Hull et al. | |
| 6,115,509 A | 9/2000 | Yeskel | |
| 6,199,073 B1 | 3/2001 | Peairs et al. | |
| 6,592,629 B1 | 7/2003 | Cullen et al. | |
| 6,665,086 B2 | 12/2003 | Hull et al. | |
| 6,704,118 B1 | 3/2004 | Hull et al. | |
| 6,938,051 B1* | 8/2005 | Burger et al. ........................ 1/1 |
| 6,957,235 B2* | 10/2005 | Peairs et al. ........................ 1/1 |
| 2002/0107710 A1* | 8/2002 | Takizawa et al. ................. 705/7 |
| 2003/0142325 A1* | 7/2003 | Leslie .............................. 358/1.1 |
| 2004/0037028 A1* | 2/2004 | Rudd et al. .................... 361/680 |
| 2004/0190057 A1* | 9/2004 | Takahashi et al. ........... 358/1.15 |
| 2005/0044183 A1* | 2/2005 | Meunier et al. ............... 709/219 |
| 2005/0105129 A1* | 5/2005 | Takahashi .................... 358/1.15 |
| 2005/0141190 A1* | 6/2005 | Rudd et al. .................... 361/686 |
| 2005/0149949 A1* | 7/2005 | Tipton et al. .................. 719/321 |
| 2006/0039707 A1* | 2/2006 | Mima .............................. 399/23 |
| 2006/0053118 A1* | 3/2006 | Takagi ............................ 707/10 |
| 2006/0077421 A1* | 4/2006 | Eden et al. ..................... 358/1.15 |
| 2006/0116977 A1* | 6/2006 | Burger et al. ...................... 707/1 |
| 2006/0232594 A1* | 10/2006 | Kanematsu ................... 345/555 |
| 2007/0182984 A1* | 8/2007 | Ragnet et al. ................. 358/1.15 |
| 2008/0043289 A1* | 2/2008 | Cranitch et al. ............. 358/402 |
| 2008/0074707 A1* | 3/2008 | Cranitch et al. ............. 358/403 |
| 2008/0145125 A1* | 6/2008 | Mestha et al. ................. 400/76 |
| 2009/0002762 A1* | 1/2009 | Sakamoto et al. ........... 358/1.16 |
| 2010/0180211 A1* | 7/2010 | Boyd ............................ 715/751 |

* cited by examiner

*Primary Examiner* — Firmin Backer
*Assistant Examiner* — Nicholas Pachol
(74) *Attorney, Agent, or Firm* — Luis M. Ortiz; Kermit D. Lopez; Ortiz & Lopez, PLLC

(57) ABSTRACT

A method and system for processing a print stream are provided. The methodology includes generating at least one copy of the print stream and transmitting a first copy of the at least one copy of the print stream to a sub-system of said computer system. The methodology further includes transmitting a second copy of the at least one copy of the print stream to a print driver and processing the second copy of the printer stream by the designated print driver. The methodology further includes transmitting the processed second copy to the at least one printer for generating a printout corresponding to the print stream.

21 Claims, 2 Drawing Sheets

METHOD AND SYSTEM FOR AUTOMATICALLY GENERATING A COPY OF A PRINT STREAM

BACKGROUND

1. Field of Related Art

The present disclosure relates to printing documents, and more particularly, to a method and system for automatically generating a copy of a print stream.

2. Background of the Related Art

Conventionally, document management required that vast amounts of documents be shipped to storage facilities and to be later retrieved if needed; the process being overly expensive and time consuming. Further, conventional document storage systems have proven to be very problematic, especially when a user must scan thousands of document pages in order to create electronic images of the document pages for electronic storage, even though the cost of electronically storing documents has become less expensive than the cost of printing and storing physical copies of the documents.

The use of digital input scanners, which can successively scan a set of sheets and record the images thereon as digital data, has become common in the office context, such as in digital copiers and electronic archiving. Unfortunately, due to the high frequency in the use of such machines and the plethora of parts involved, there are many problems associated with the scanning process, especially when the process involves scanning thousands of document pages or large volumes of documents. Thus, there is a need in the art to electronically copy documents in a fast, accurate, and most efficient manner. Although there are pseudo-print drivers used to drive many different alternative "print" workflows like print-to-PDF, print-to-fax, print-to-web, print-to-printshop, the current state of these "print" workflows do not transfer the document to an electronic document storage system.

A conventional printing system typically includes three components: (1) a user; (2) a server; and (3) a peripheral device. The user via a graphical user interface causes a print command to be transmitted to a processor of a computer system. The processor then transmits the print command to the peripheral device, such as a MFD, either directly or via a server. The peripheral device, besides being an MFD, can include a printer, xerographic machine, or any other network type of device capable of performing a virtual printing function (e.g., print-to-PDF) or actual printing function. In an office network environment, a user normally uses a desktop computer with multiple printers connected to it via the network, allowing the user to select which output device/printer he desires to send his print request to.

Prior art printing systems lack the capability to automatically generate an electronic copy of a print stream transmitted to one of many output devices or printers. Accordingly, in order for the printed document to be electronically stored, the printed document must be scanned or imaged and then transferred to an electronic document storage system.

SUMMARY

The present disclosure overcomes drawbacks of prior art methods and systems by providing for automatically generating a copy of a print stream in a most efficient and productive manner. This functionality enables business process automation and lends itself to the adoption of a business document storage workflow for electronic document storage which is transparent to the user.

In particular, the present disclosure provides selection of a proxy print driver for printing a document. The proxy print driver receives an incoming print stream corresponding to the document to be printed and makes a copy of the incoming print stream. The proxy print driver transmits a first copy of the print stream to a related sub-system and a second copy of the print stream to a selected print driver for printing a hard copy of the document corresponding to the print stream. The first copy of the print stream can be rasterized to a particular type of electronic file, such as PDF, MTIFF, etc., and is then transmitted to a destination, such as an electronic document storage system, email system, physical storage media, such as CD-ROM, hard drive, EEPROM, flash memory drive, etc.

The present disclosure further provides, in a computer system having at least one printer for processing a print stream, a method which includes generating at least one copy of the print stream and transmitting a first copy of the at least one copy of the print stream to a sub-system of the computer system. The method further includes transmitting a second copy of the at least one copy of the print stream to a print driver, processing the second copy of the printer stream by the print driver, and transmitting the processed second copy to the at least one printer for generating a printout corresponding to the print stream.

The present disclosure also provides a computer system including at least one processor, and a proxy print driver module having a set of programmable instructions configured for execution by the at least one processor for generating at least one copy of a print stream. The computer system further includes a sub-system for receiving a first copy of the at least one copy of the print stream from the proxy print driver module and for processing the first copy to create a predetermined document type for electronic storage. The computer system also includes a print driver for receiving a second copy of the at least one copy of the print stream from the proxy print driver module and processing the second copy for printing by at least one printer.

The present disclosure further provides a computer-readable medium storing a set of programmable instructions configured for being executed by at least one processor for performing the methods described herein in accordance with the present disclosure. The computer-readable medium can include flash memory drive, an EEPROM, CD-ROM, a hard drive, a processing unit, a database, etc.

BRIEF DESCRIPTION OF THE DRAWINGS

Various embodiments of the present disclosure will be described herein below with reference to the figures wherein.

DETAILED DESCRIPTION

Figure 1:
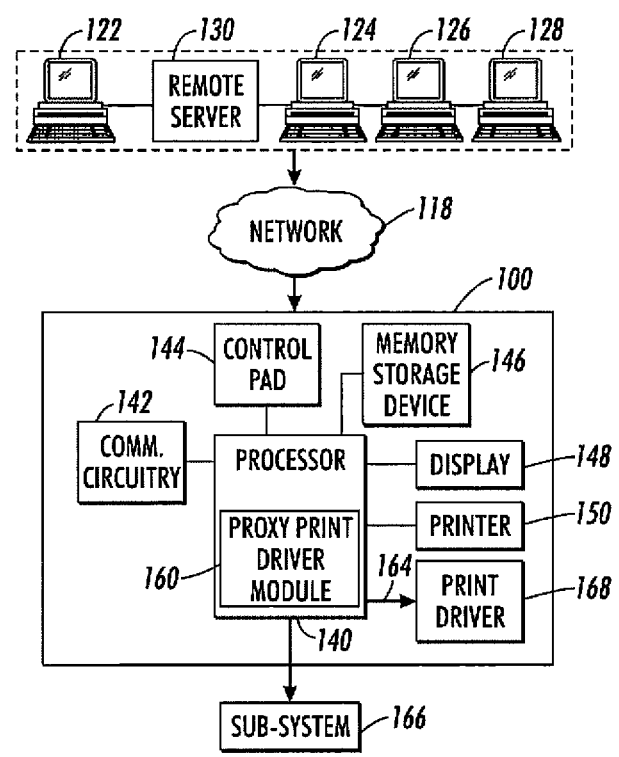
FIG. 1 is a block diagram of a computer system for generating a copy of a print stream in accordance with the present disclosure.

The present disclosure relates to printing and electronic storage of documents, and more particularly, to a method and system for generating at least one copy of an incoming print stream by a proxy print driver module and storing the at least one copy of the incoming print stream. One copy of the print stream is transmitted to a print driver for printing a document corresponding to the print stream by at least one printer, such as a xerographic machine. Another copy of the print stream is transmitted to a sub-system of the system prior to being transmitted to a network destination for electronic storage.

The sub-system is defined herein as a system being independent and/or interdependent of the system. The sub-system can be operated by the operator of the system or another operator.

As used herein, the term "print driver" is defined as a print processor or software that converts data to be printed to an electronic format suitable for printing by a specific printer. As used herein, the term "proxy print driver module" is defined as a set of programmable instructions configured for being executed by at least one processor for generating at least one copy of a print stream. One copy of the at least one copy is transmitted along a first data path and another copy of the at least one copy is transmitted along a second data path.

The term "print" is defined herein as transmitting a print stream corresponding to a document to a printer through any one of a multitude of ways for generating a printout or physical copy of the document. Further, the term "printer" can refer to any device that accepts text and graphic output from any type of computing device and transfers the information to any printable medium. A "printer" can refer to any type of xerographic, solid ink, liquid ink, cut sheet or web-based device used to print onto a wide array of printable media. The term "printer" as used herein encompasses any apparatus, such as a digital copier, bookmaking machine, facsimile machine, multi-function machine/device, etc. which performs a print outputting function for any purpose.

The term "print stream" may be defined as the page description language (PDL) data to be printed. Further, the term "print stream" can also include any added instructions on how to print the data. The term "copy" of the print stream, as used herein, may be defined as a duplicate of all the data (bit-for-bit), including the PDL data, corresponding to the print stream. Each receiving service which receives the data decides on its own how to use the data it receives.

The term "MFD" can refer to any device/machine that connects to either a computing device and/or network and performs two or more of the following functions: print, scan, copy, and/or fax. Digital copiers, fax machines, printers, and scanner combinations are all examples of MFDs. The term "MFD" can further refer to any hardware that combines several functions in one unit. For instance, an MFD can be a standalone printer or any type of standalone machine/device/apparatus/component. For example, an MFD can be one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics can apply in any type of entertainment, communications, home, and/or office capacity. Thus, the term "MFDs" can refer to any type of electronics suitable for use with a circuit board and intended to be used by a plurality of individuals for a variety of purposes.

The computer system further includes a printer and communications circuitry for connecting to at least one network and establishing at least one network connection for communicating via the at least one network with one or more computing devices. The at least one processor is operable to control the various components and assemblies of the computer system, including the display for displaying the status of print requests and user options such as re-try and delete. The at least one processor is configured for executing a set of programmable instructions of the proxy print driver module for generating at least one copy of an incoming print stream and for transmitting a first copy of the print stream along a first data path, e.g., along a data path linked to a sub-system computer system, and a second copy of the print stream along a second data path, e.g., along a data path linked to a print driver corresponding to a printer.

Embodiments will be described below while referencing the accompanying figures. The accompanying figures are merely examples and are not intended to limit the scope of the present disclosure.

With reference to FIG. 1, there is depicted a block diagram of a computer system 100 capable of printing a document by a printer 150. The printer 150 can be directly connected to the computer system 100 or connected via a network. The computer system 100 can be a remote server, personal computer, etc. The computer system 100 can also be a multi-function device (MFD) having at least one printer built therein, such as a xerographic printer. The MFD can be of the type having the capability of scanning, copying and electronically transmitting documents, such as via facsimile and email transmission. The computer system 100 can also be a PDA in operative communication with a printer.

The computer system 100 receives print commands via a network 118, such as the Internet, from a plurality of computing devices, such as personal computers 122, 124, 126 and 128, and/or a remote server 130 to print documents. The documents can be stored within the plurality of personal computers 122, 124, 126 and 128 and/or remote server 130, or other computing device, such as a database, and transmitted along with the print commands to the computer system 100 for printing and electronic storage in accordance with the methodology of the present disclosure. The print commands are generated by applications, such as word processing applications, running on the personal computers 122, 124, 126 and 128, and/or remote server 130, as known in the art.

The computer system 100 can be operated by a service provider. The service provider can be an Independent Service Organization (ISO). An ISO can be any entity that develops, offers, controls, manages, owns, alters and/or sells software and/or hardware products. An ISO can be any entity that performs one or more tasks on one or more pre-existing MFDs/computing devices, which may or may not be controlled or owned by the ISO. For example, the entity can offer a service with an existing software package and/or with any type of existing Internet-based service. In other words, an ISO need not own or provide the MFDs/computing devices.

The MFDs/computing devices may be owned or provided by any third party not related or associated with the ISO. In the present disclosure, it is contemplated that the entity (such as an ISO) can offer the service of generating a copy of the print stream and forwarding one copy of the print stream to a print driver 168 for printing by a printer 150 and the other copy of the print stream to a sub-system 166 for electronic storage. The term "entity" can refer to anything that may exist as a discrete and/or distinct unit that owns, operates, manages, and/or controls one or more of a plurality of machines (such as MFDs). For example, the term "entity" may include the term "company."

The computer system 100 can further be owned and/or operated by an individual who purchases software having a set of programmable instructions corresponding to a proxy print driver module 160. The module 160 is downloaded to at least one processor 140 of the computer system 100 and stored therein. The set of programmable instructions of the module 160 once downloaded are executed by the at least one processor 140 of the computer system 100 for making copies of print streams, forwarding one copy of the print stream to the print driver 168 via path 164 for printing by the printer 150, and forwarding the other copy of the print stream to the sub-system 166 via path 162 for electronic storage or other purpose.

The computer system 100, as shown by FIG. 1, further includes communications circuitry 142 for establishing and maintaining communications with the network 118; a control pad 144, such as a keyboard; a memory storage device 146, such as a hard drive; and a display 148.

In operation, from an application a user invokes a "normal" print operation selecting the proxy print driver. Alternatively, the proxy print driver is transparent to the user and is selected automatically by an application running on the personal computers 122, 124, 126 and 128 and/or remote server 130. After selecting the proxy print driver, the at least one processor 140 then executes the set of programmable instructions corresponding to the proxy print driver module 160. The proxy print driver module 160 generates a copy of an incoming print stream, transmits a copy of the print stream 164 to the print driver 168, and transmits another copy of the print stream 162 to a related sub-system 166.

The related sub-system 166 can render the print stream a raster document (such as, Multi-page Tagged Image File Format (MTIFF) or a Portable Document Format (PDF)) and subsequently transmit it to a configurable network destination, such as FTP, e-mail, SMB or network folder. Alternatively, the sub-system 166 does not render the print stream a raster document, but rather transmits the print stream to a network destination in the same format as it received the print stream, such as binary code.

It is contemplated that the proxy print driver module 160 provides the user with feedback on the status of print requests/commands and the at least one processor 140 sends the feedback and other information to the display 148 for viewing by the user. The proxy print driver module 160 can also enable user functions including re-try and delete, thereby, giving the user the options of regenerating a print request or deleting a print request from a printer queue.

In accordance with the present disclosure, in effect, the set of programmable instructions of the proxy print driver module 160 generate a carbon copy of the print stream in the traditional print path. The carbon copy of the print stream can be used in a wide variety of ways by a user/system operator to enable various functions, such as for enabling business process automation, for archiving print streams for printing at a future date in the event hard copies corresponding to the print streams are destroyed or lost, for forwarding to a secondary printer for printing at a later date. The secondary printer can be located at a different location than the printer 150

The set of programmable instructions of the proxy print driver module 160 can be application software stored within a memory, such as RAM and ROM, of the at least one processor 140, and or a computer-readable medium, such as a hard drive, CD-ROM, flash memory drive, an EEPROM, a processing unit, a database, etc., readable by one or more reading devices of the computer system 100 or other system.

Figure 2:
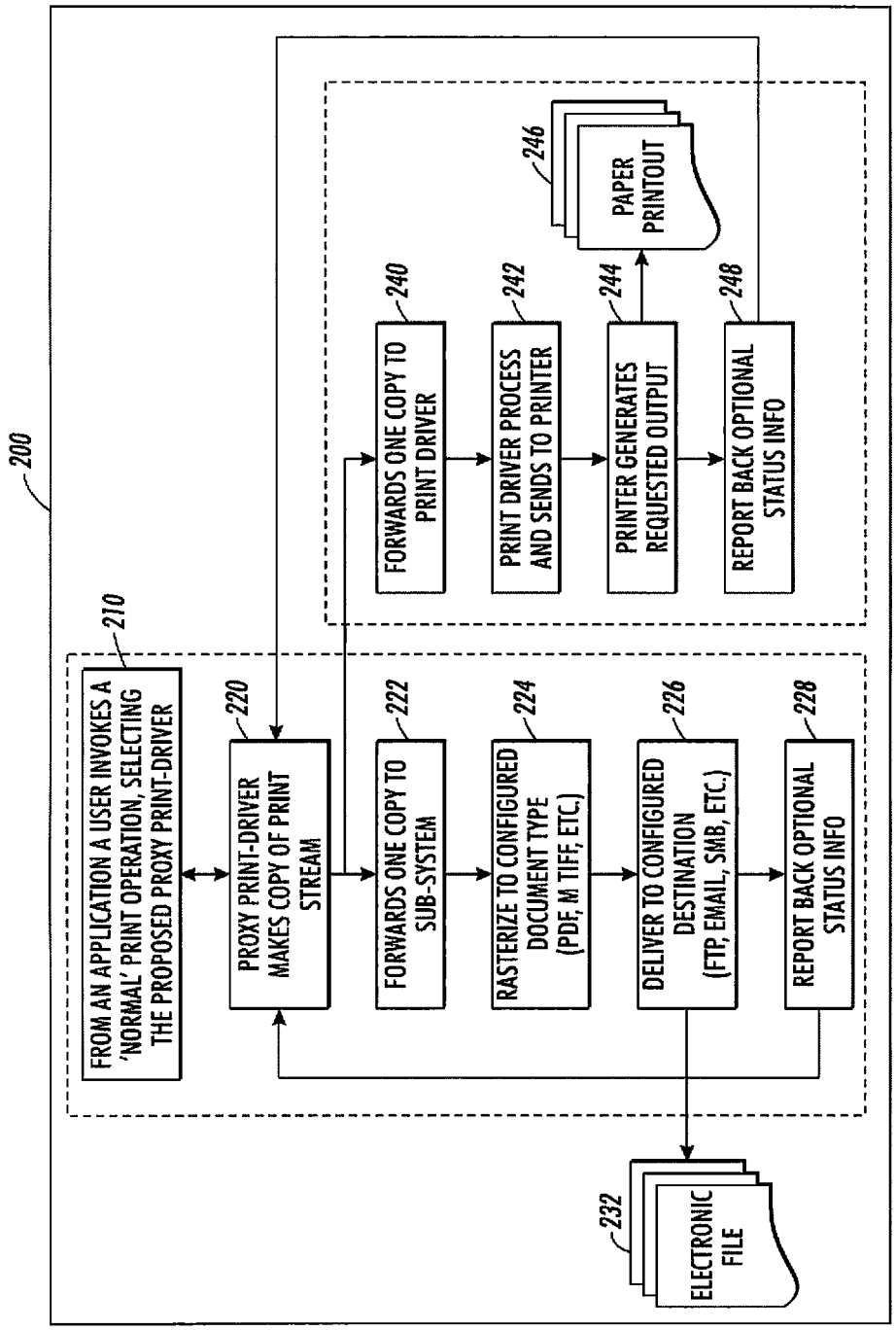
FIG. 2 is a flow chart of a method for generating a copy of a print stream in accordance with the present disclosure.

With reference to FIG. 2, there is illustrated a flow chart of a method of an exemplary method operation in accordance with the present disclosure. In initial step 210, a user invokes a "normal" print operation and selects the proxy print-driver for performing a print function. Then, in step 220, the proxy print driver module 160 generates at least one copy of the print stream generated after the print operation is invoked by the user. In step 222, the proxy print driver module 160 transmits a first copy of the print stream to a sub-system, and substantially simultaneously, in step 240, the proxy print driver module 160 transmits a second copy of the print stream to the print driver 168.

The first copy of the print stream is transferred to the sub-system is rasterized to a particular document type in step 224 and delivered to a configured destination in step 226, such as stored as an electronic file 232 in a memory storage device. In step 228, status information regarding the delivery of the rasterized copy of the print stream to a configured destination is reported back to the proxy print driver module 160 for informing the user, if the user has so opted. The memory storage device may be a hard drive, a CD-ROM, a flash memory drive, an EEPROM, a processing unit, or a database.

The other copy of the print stream forwarded in step 240 to the print driver 168 is processed by the print driver 168 and sent to the printer 150 for printing in step 242. Next, in step 244, the printer 150 generates requested output, such as a paper output 246. In step 248, status information regarding the printing of the document corresponding to the print stream is reported back to the proxy print driver module 160 for informing the user, if the user has so opted.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. In a computer system in operative communication with at least one printer, a method for processing a print stream comprising:

generating at least one bit for bit copy of the print stream, wherein said print stream comprises page description language data and instructions for printing said page description language data;

transmitting a first copy of the at least one copy of the print stream to a sub-system computer system independent of said computer system for processing;

transmitting said processed first copy from said sub-system to a memory storage device;

transmitting said first copy from said memory storage device to a secondary printer at a later date wherein said secondary printer is at a different location;

transmitting a second copy of the at least one copy of the print stream to a print driver;

processing said second copy of the printer stream by said print driver;

transmitting said processed second copy to said at least one printer for generating a printout corresponding to the print stream; and said sub-system is programmed for rasterizing said first copy to a particular pre-selected document type.

2. The method according to claim 1, wherein said computer system comprises a personal digital assistant.

3. The method according to claim 2, further comprising transmitting the rasterized first copy of print stream as a Multi-page Tagged Image File Format to said memory storage device for storage therein.

4. The method according to claim 3, wherein the rasterized first copy of the print stream is transmitted via electronic mail to a configurable network destination comprising a server message block.

5. The method according to claim 3, wherein the memory storage device is selected from the group consisting of a hard drive, a CD-ROM, a flash memory drive, EEPROM, a processing unit, and a database.

6. The method according to claim 1, wherein the step of generating the at least one copy of the print stream is performed by a proxy print driver module associated with an Independent Service Organization comprising an entity that develops hardware and software products having a set of programmable instructions configured for execution by at least one processor of the computer system for generating the at least one copy of the print stream.

7. The method according to claim 6, further comprising transmitting a message to said proxy print driver module following the generation of said printout, said message including a status message indicating the generation of said printout; and said proxy print driver module providing an associated message indicative of a print status request/command to a user.

8. The Method according to claim 7, further comprising transmitting a message to said proxy print driver module following the storage of the rasterized first copy of the print stream, said message including a status message indicating the storage of said rasterized first copy and said proxy print driver module providing an associated message indicative of a print status request/command to a user.

9. A computer system comprising:
at least one processor;
a proxy print driver module having a set of programmable instructions configured for execution by the at least one processor for generating at least one bit for bit copy of a print stream, wherein said print stream comprises page description language data and instructions for printing said page description language data;
an independent sub-system computer system for receiving a first copy of the at least one copy of the print stream from the proxy print driver module, said sub-system processing said first copy to create a predetermined document type for electronic storage wherein said electronic storage is configured to transmit said first copy to a secondary printer at a later date wherein said secondary printer is at a different location;
a print driver for receiving a second copy of the at least one copy of the print stream from the proxy print driver module, said print driver processing said second copy for printing by at least one printer; and
said sub-system is configured for rasterizing said first copy to said predetermined document type.

10. The computer system according to claim 9, wherein said computer system multi-function device comprising at least one of an MP3 player, audio electronics, video electronics, GPS systems, or televisions and at least one printer associated therewith.

11. The computer system according to claim 9, further comprising;
transmitting said predetermined document type to a predetermined electronic destination; and
transmitting said processed second copy to the at least one printer for generating a printout corresponding to the print stream.

12. The computer system according to claim 11, wherein said computer system comprises a personal digital assistant.

13. The computer system according to claim 12, wherein said rasterized first copy of the print stream comprises a Multi-page Tagged Image File Format and is transmitted to memory storage device for storage therein.

14. The computer system according to claim 13, wherein the rasterized: first copy of the print stream is transmitted via electronic mail to a configurable network destination comprising a server message block.

15. The computer system according to claim 13, wherein the memory storage device is selected from the group consisting of a hard drive, a CD-ROM, a flash memory drive, an EEPROM, a processing unit and a database.

16. The computer system according to claim 13, further comprising transmitting a message to said proxy print driver module following the storage of the rasterized first copy of the print stream, said message inducing a status message indicating the storage of said rasterized first copy and;

providing an associated message from said proxy print driver module indicative of a print status request/command to a user.

17. The computer system according to claim 11, further comprising transmitting a message to said proxy print driver module following the generation of said printout, said message including a status message indicating the generation of said printout; and providing an associated message from said proxy print driver module indicative of a print status request/command to a user.

18. A non-transitory computer-readable medium storing programmable instructions configured for execution by at least one processor for performing a method comprising:
generating at least one bit for bit copy of the print stream, wherein said print stream comprises page description language data and instructions for printing said page description language data;
transmitting a first copy of the at least one copy of the print stream to a sub-system computer system independent of said computer system for processing;
transmitting said processed first copy from said sub-system to a memory storage device;
transmitting said first copy from said memory storage device to a secondary printer at a later date wherein said secondary printer is at a different location;
transmitting a second copy of the at least one copy of the print stream to a print driver;
processing said second copy of the printer stream by said print driver;
transmitting said processed second copy to said at least one printer for generating a printout corresponding to the print stream; and
said sub-system is programmed for rasterizing said first copy to a particular pre-selected document type.

19. The non-transitory computer-readable medium according to claim 18, further comprising:
rasterizing said first copy to a particular document type comprising a Multi-page Tagged Image File Format; and
the step of transmitting the rasterized first copy of the print stream comprising a Multi-page Tagged Image File Format to said memory storage device for storage therein.

20. The non-transitory computer-readable medium according to claim 18, wherein the step of generating the at least one copy of the print stream is performed by a proxy print driver module associated with an Independent Service Organization comprising an entity that developes hardware and software products having a set of programmable instructions configured for execution by at least one processor of the computer system for generating the at least one copy of the print stream.

21. The non-transitory computer-readable medium according to claim 18, further comprising the step of
transmitting a message to said proxy print driver module following the storage of the rasterized first copy of the print stream, said message including a status message indicating the storage of said rasterized first copy; and providing an associated message from said proxy print driver module indicative of a print status request/command to a user.

\* \* \* \* \*